US005551183A

United States Patent [19]
Solem

[11] Patent Number: 5,551,183
[45] Date of Patent: Sep. 3, 1996

[54] HANDS-FREE FISHING SYSTEM

[76] Inventor: Donald G. Solem, 5845 Jean Duluth Rd., Duluth, Minn. 55803

[21] Appl. No.: 492,187

[22] Filed: Jun. 19, 1995

[51] Int. Cl.⁶ ................................................. A01K 97/12
[52] U.S. Cl. ................................................. 43/17; 43/21.2
[58] Field of Search ....................................... 43/17, 21.2

[56] References Cited

U.S. PATENT DOCUMENTS

| | | | |
|---|---|---|---|
| 3,879,880 | 4/1975 | Bailey | 43/17 |
| 3,962,812 | 6/1976 | Means et al. | 43/17 |
| 4,517,760 | 5/1985 | Randle | 43/21.2 |
| 5,120,016 | 6/1992 | Dysarz | 43/21.2 |
| 5,249,387 | 10/1993 | Slocum et al. | 43/17 |
| 5,450,687 | 9/1995 | Fox | 43/17 |

*Primary Examiner*—Kurt Rowan
*Assistant Examiner*—Darren Ark Da

[57] ABSTRACT

A hands-free fishing system with a signaling flag comprising a fishing rod formed of a handle at its lower extent and a cylindrical rod at its upper extent is disclosed. An upper extent of the rod has a region for the receipt of a portion of a bracket. A reel is secured to the handle with a line extending upwardly through the eyelet of the rod and the eyelet of the post and downwardly therefrom to the area being fished. An upwardly extending cylindrical support extends upwardly to receive the lower end of the handle whereby when fishing in a hands-free mode, a fish biting on the line will pull the line to pivot the post and raise the flag as an indicator that a bite has occurred.

2 Claims, 4 Drawing Sheets

5,551,183

HANDS-FREE FISHING SYSTEM

BACKGROUND OF THE INVENTION

1. Field of the Invention

The present invention relates to a new and improved hands-free fishing system and, more particularly, pertains to allowing fishermen to fish with a rod and reel without the use of hands wherein the apparatus will signal a bite by raising a flag.

2. Description of the Prior Art

The use of fishing rods, reels and systems of a wide variety of designs and configurations is known in the prior art. More specifically, fishing rods, reels and systems of a wide variety of designs and configurations heretofore devised and utilized for the purpose of assisting fishermen through variations in known equipment and through a wide variety of methods and apparatuses are known to consist basically of familiar, expected, and obvious structural configurations, notwithstanding the myriad of designs encompassed by the crowded prior art which has been developed for the fulfillment of countless objectives and requirements.

The prior art discloses a large number of devices for allowing fishermen to fish with a rod and reel without the use of hands wherein the apparatus will signal a bite by raising a flag. By way of example, U.S. Pat. No. 4,285,154 to Grahl discloses a tip-up flag device for ice fishing.

U.S. Pat. No. 5,067,269 to Eppley et al. discloses an ice fishing tip-up with indicator light and flag.

U.S. Pat. No. 5,097,618 to Stoffel discloses an electronic ice fishing system.

U.S. Pat. No. 5,163,243 to Wold, Jr. et al. discloses a fishing automatic tip-Up.

Lastly, U.S. Pat. No. 5,235,773 to Rinehart discloses a fold-up compact storage ice-fishing rig.

In this respect, the hands-free fishing system according to the present invention substantially departs from the conventional concepts and designs of the prior art, and in doing so provides an apparatus primarily developed for the purpose of allowing fishermen to fish with a rod and reel without the use of hands wherein the apparatus will signal a bite by raising a flag.

Therefore, it can be appreciated that there exists a continuing need for a new and improved hands-free fishing system which can be used for allowing fishermen to fish with a rod and reel without the use of hands wherein the apparatus will signal a bite by raising a flag. In this regard, the present invention substantially fulfills this need.

SUMMARY OF THE INVENTION

In view of the foregoing disadvantages inherent in the known types of fishing rods, reels and systems of a wide variety of designs and configurations now present in the prior art, the present invention provides an improved hands-free fishing system. As such, the general purpose of the present invention, which will be described subsequently in greater detail, is to provide a new and improved hands-free fishing system and methods which has all the advantages of the prior art and none of the disadvantages.

To attain this, the present invention essentially comprises a new and improved hands-free fishing system with a signaling flag comprising, in combination, a fishing rod formed of a handle at its lower extent and a cylindrical rod at its upper extent, the cylindrical rod having a lower extent, an upper extent and an intermediate extent therebetween, the intermediate extent having an eyelet extending radially outward therefrom, the upper extent of the rod having a region for the receipt of a portion of a bracket; a supplemental cylindrical post having an upper end formed with a loop constituting an eyelet and having a lower end for supporting a flag and having an intermediate extent for receiving a portion of a bracket; a reel secured to the handle with a line extending upwardly through the eyelet of the rod and the eyelet of the post and downwardly therefrom to the area being fished; a bracket coupling adjacent regions of the rod and the post, the bracket having a spring plate of a resilient material with apertures at its opposite ends to receive central extents of the post and to allow the adjustment of the position with respect to each other, the plate having a central aperture, the bracket also having a pair of convex surfaces secured to the rod adjacent to the upper extent with tabs having apertures and a bolt with a wing nut extending therethrough for adjustably tightening the bracket with respect to the rod at a predetermined location, the bracket also having a pin with a head extending radially outward from one of the convex surfaces and being located through the central aperture of the plate and with a coil spring around the pin to hold the plate at a fixed position with respect to the convex portion of the bracket; a planar sheet having a large forward end and a small rearward end with a periphery therearound, the periphery having an inwardly directed slot for the passage of the line therethrough during operation and use; and an upwardly extending cylindrical support extending upwardly at an angle from the vertical of between about five and fifteen degrees in a direction whereby its axis overlies the innermost region of the linear recess, the cylindrical support having an interior surface of a size to receive the lower end of the handle whereby when fishing in a hands-free mode, a fish biting on the line will pull the line to pivot the post and raise the flag as an indicator that a bite has occurred.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence Of the technical disclosure of the application. The abstract is neither intended to define the invention of the application, which is measured by the claims, nor is it intended to be limiting as to the scope of the invention in any way.

It is therefore an object of the present invention to provide a new and improved hands-free fishing system which has all the advantages of the prior art fishing rods, reels and systems of a wide variety of designs and configurations and none of the disadvantages.

It is another object of the present invention to provide a new and improved hands-free fishing system which may be easily and efficiently manufactured and marketed.

It is a further object of the present invention to provide a new and improved hands-free fishing system which is of a durable and reliable construction.

An even further object of the present invention is to provide a new and improved hands-free fishing system which is susceptible of a low cost of manufacture with regard to both materials and labor, and which accordingly is then susceptible of low prices of sale to the consuming public, thereby making such fishing rods, reels and systems of a wide variety of designs and configurations economically available to the buying public.

Still yet another object of the present invention is to provide a new and improved hands-free fishing system which provides in the apparatuses and methods of the prior art some of the advantages thereof, while simultaneously overcoming some of the disadvantages normally associated therewith.

Even still another object of the present invention is to allow fishermen to fish with a rod and reel without the use of hands wherein the apparatus will signal a bite by raising a flag.

Lastly, it is an object of the present invention to provide a hands-free fishing system with a signaling flag comprising a fishing rod formed of a handle at its lower extent and a cylindrical rod at its upper extent. The cylindrical rod has a lower extent, an upper extent and an intermediate extent therebetween. The intermediate extent has an eyelet extending radially outward therefrom. The upper extent of the rod has a region for the receipt of a portion of a bracket. A supplemental cylindrical post has an upper end formed with a loop constituting an eyelet and has a lower end for supporting a flag. It further comprises an intermediate extent designed to receive a portion of a bracket. A reel is secured to the handle with a line extending upwardly through the eyelet of the rod and the eyelet of the post and downwardly therefrom to the area being fished. A bracket couples adjacent regions of the rod and the post. A planar sheet has a large forward end and a small rearward end with a periphery therearound, the periphery having an inwardly directed slot for the passage of the line therethrough during operation and Use. An upwardly extending cylindrical support extends upwardly to receive the lower end of the handle whereby when fishing in a hands-free mode, a fish biting on the line will pull the line to pivot the post and raise the flag as an indicator that a bite has occurred.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
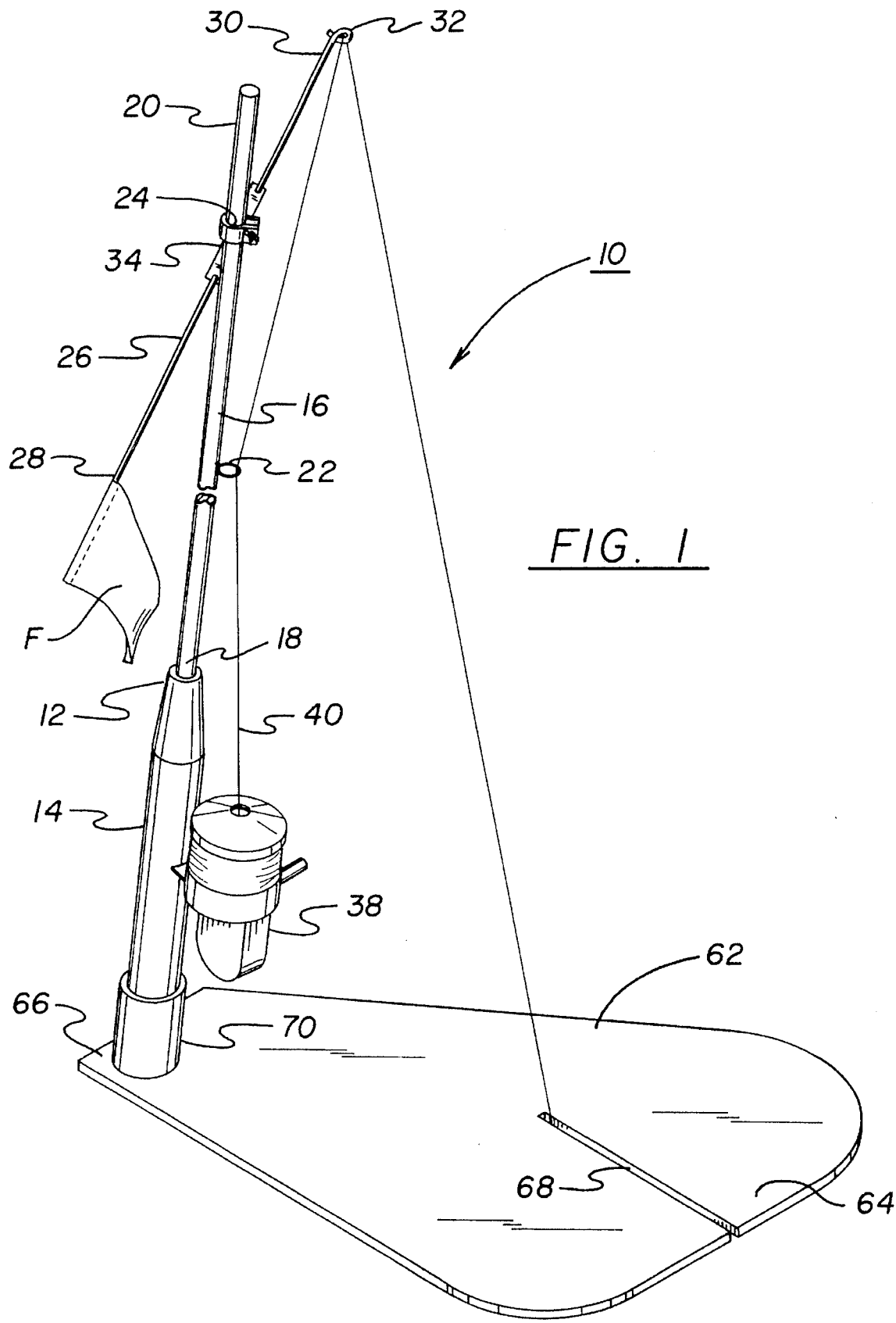
FIG. 1 is a perspective illustration of the preferred embodiment of the new and improved hands-free fishing system constructed in accordance with the principles of the present invention.
Figure 2:
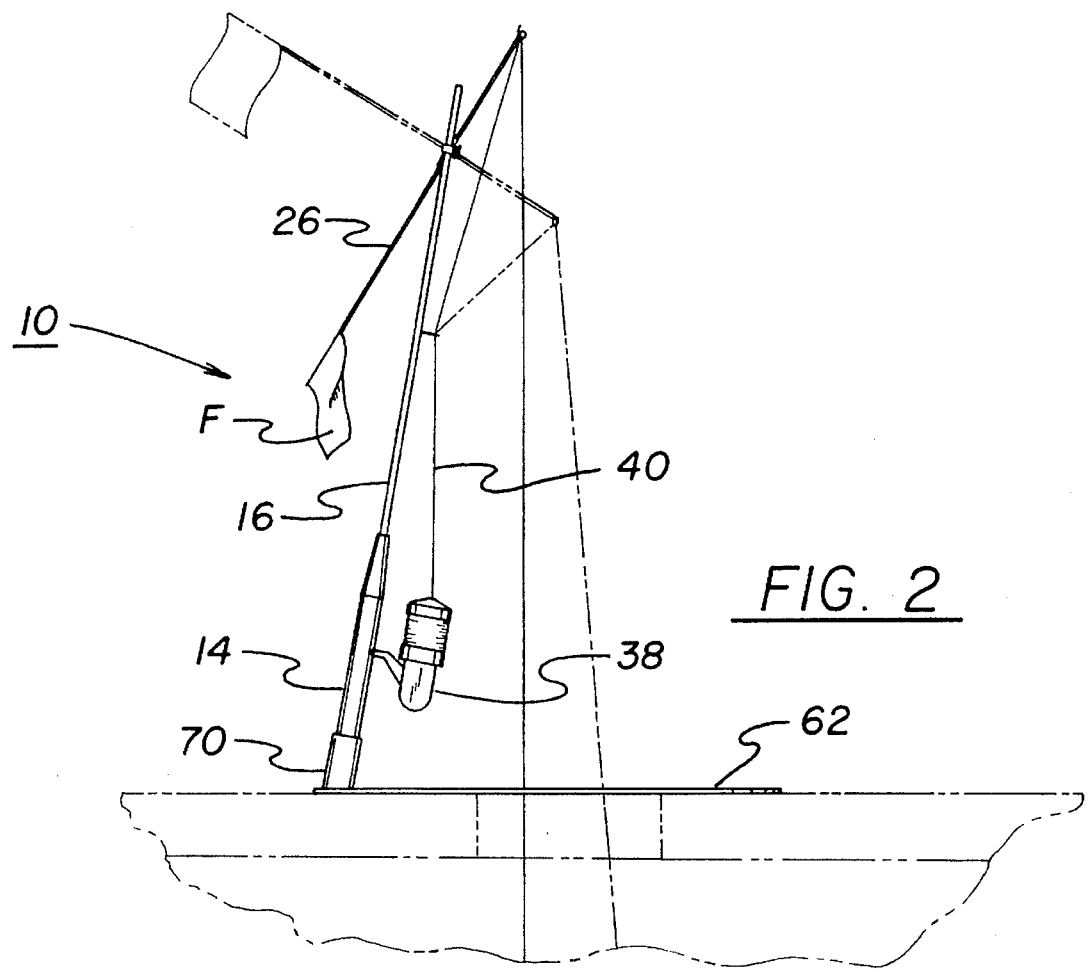
FIG. 2 is a side elevational view thereof illustrating the flag in a lower orientation and an elevated orientation indicating a bite from a fish.
Figure 3:
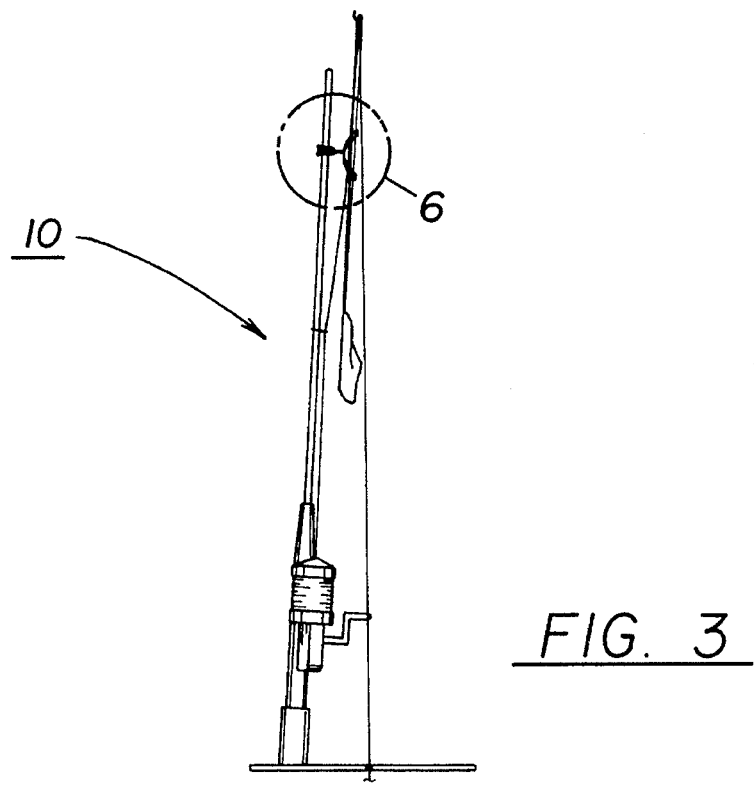
FIG. 3 is a side elevational view thereof showing the flag in the lowermost position.
Figure 4:
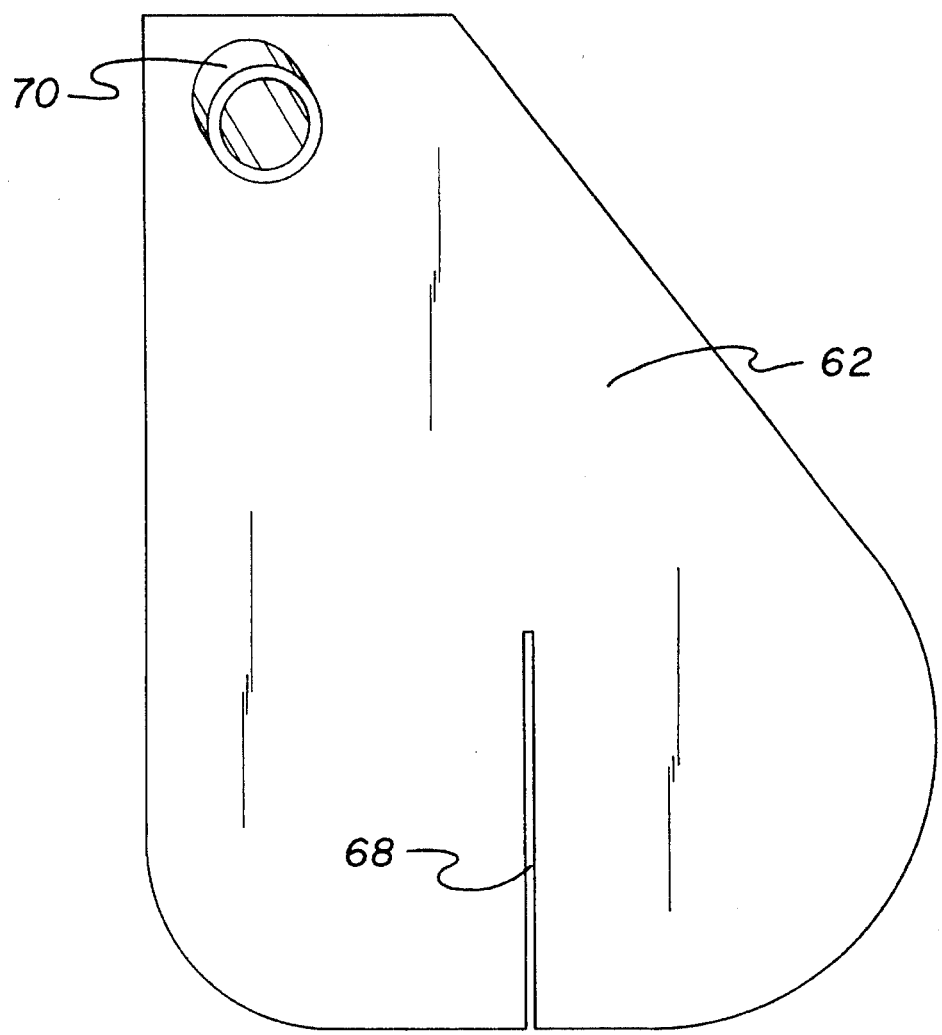
FIG. 4 is a plan view of the planar support sheet.
Figure 5:
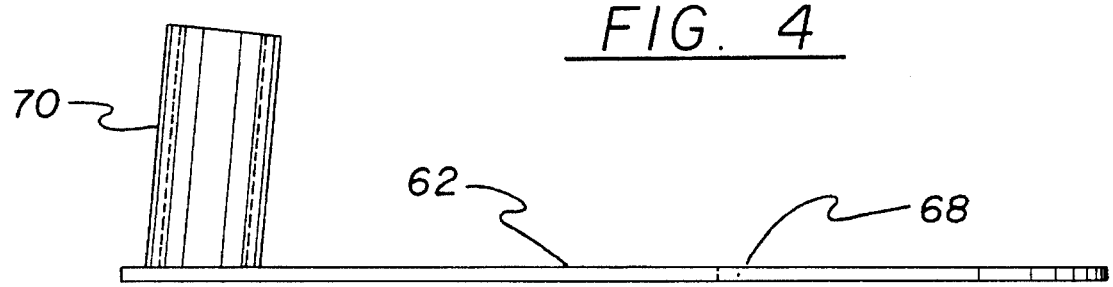
FIG. 5 is a side elevational view of the planar support sheet of FIG. 4.
Figure 6:
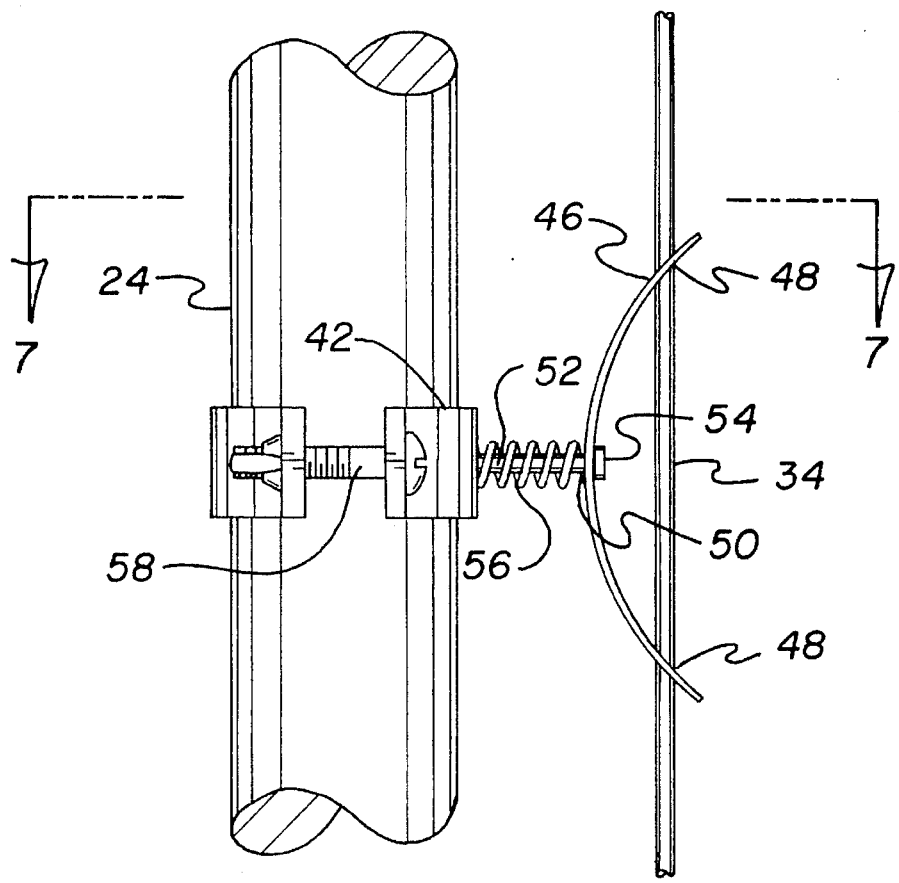
FIG. 6 is an enlarged illustration of the bracket taken at circle 6 of FIG. 3.
Figure 7:
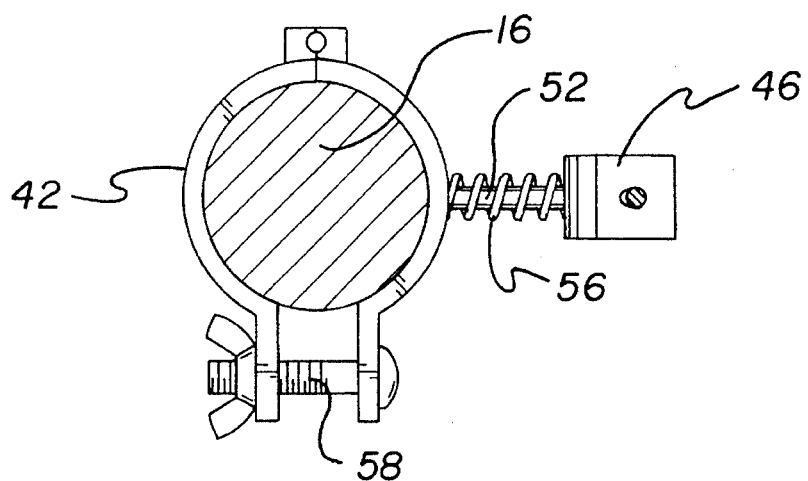
FIG. 7 is a cross-Sectional view taken along line 7—7 of FIG. 6.

With reference now to the drawings, and in particular to FIG. 1 thereof, the preferred embodiment of the new and improved hands-free fishing system embodying the principles and concepts of the present invention and generally designated by the reference numeral 10 will be described.

The present invention, the new and improved hands-free fishing system, is a system 10 comprised of a plurality of components. In their broadest context, the components include a rod, a post, a reel, a bracket, and a planar sheet with a cylindrical support. Each of the individual components is specifically configured and correlated one with respect to the other so as to attain the desired objectives.

More specifically, the hands-free fishing system 10 of the present invention includes a signal flag "F" to indicate the bite by a fish. The system 10 has, as its main component, a fishing rod 12 formed of a handle 14 at its lower extent and a cylindrical rod 16 at its upper extent. The cylindrical rod has a lower extent 18 and an upper extent 20. It also has an intermediate extent therebetween. The intermediate extent is formed with a relatively conventional eyelet 22 Such eyelet extends radially outwardly from the cylindrical rod. The upper extent of the rod has a region 24 for the receipt of a portion of a bracket 34 as will be described in greater detail hereinafter.

In association with the rod is a supplemental cylindrical post 26. Such post has an upper end 30. The upper end is formed with a loop which constitutes an eyelet 32. The post also has a lower end 28 for supporting a flag "F". Such flag is normally at the lower end but pivots to the upper end upon the occurrence of a bite. The post has an intermediate extent for receiving a portion of the bracket 34 coupled also with respect to the rod.

In association with rod and handle is a reel 38. The reel is secured, preferably removable, to the handle. The reel also includes a line 40. Such line extends upwardly through the eyelet of the rod and through the eyelet of the post. It then extends downwardly therefrom into the water therebeneath the area being fished.

Coupling between the rod and post is effected through a pivotable bracket 34. Such bracket couples adjacent regions of the rod and post and allows pivoting of the post with respect to the rod in the event of a bite. Such bracket has a spring plate 46 of a resilient material as a primary component. Such plate has apertures 48 at its opposite ends to receive central extents of the post. This relationship allows for the adjustment of the position of the post with respect to the rod. The plate also has a central aperture 50.

Another major component of the bracket 34 is a pair of relatively rigid but convex surfaces 42. Such surfaces are pivoted together through a pivot pin at one end. The surfaces are secured to the rod in contact therewith adjacent to the upper extent of the rod. The convex surfaces terminate at the side remote from the pivot pin with tabs. Such tabs have apertures for the receipt of a bolt 58. The bolt has an associated wing nut for adjustably tightening and loosening the bracket with respect to the rod to allow positioning at a predetermined desired location along the length of the rod.

The intermediate portion of the bracket includes a pin 52 with a head 54. The pin extends radially outward from one of the convex surfaces and is located through the central aperture of the plate. A coil spring 56 is located around the pin tending to separate the rod and post to hold the plate and post at a fixed position with respect to the convex portion of the bracket until a supplemental force as caused by the biting of a fish effects movement of the post and its rotation with respect to the rod to raise the flag.

In association with the above components is a planar sheet 62. Such sheet has a large forward end 64 and a small rearward end 66. The sheet also has a periphery therearound. The periphery is formed with an inwardly directed slot 68 for the passage of the line therethrough during operation and use.

Lastly provided is an upwardly extending cylindrical support 70. Such support extends upwardly at an angle from the vertical of between about five and fifteen degrees. It is formed with its axis in a direction whereby its axis will overlie the innermost region of the linear recess. The cylindrical support also has an interior surface of a size to receive the lower end of the handle. In this manner, when fishing in a hands-free mode, a fish biting on the line will pull the line to pivot the post downwardly. This will raise the flag as an indicator that a bite has occurred.

The present invention is easily set up and clearly visible, thus allowing the angler to relax until a fish strikes. Two units are included, one a plastic base that sets on the ice or ground, and the other a tip-up with a flag at one end. The base is flat and made of plastic in a triangular shape with rounded corners. A pen-type holder extends up near the apex, holding a fishing pole slightly inclined from the vertical position, and in line with a slot in the base. This allows the fishing line to pass through and drop into the ice below. The tilt is a plastic rod with a stiff red flag attached at a right angle on one end and an eyelet on the other. A sliding clip is between the two ends of the tilt and is mounted on a spring pivot that is on an alligator clip.

After a hole has been cut in the ice the base is set over it and the pole inserted in the holder. The pivot is clamped to an eye on the pole and the clip position adjusted to allow the flag to hang down when the weighted fishing line passes through the eyelet, the slot in the base, and the water. If a fish pulls on the bait, the force tilts the tip-up rod eyelet down bringing the flag upright and making it clearly visible.

The value of the present invention is not only its simplicity but its total reliability. It can be set up very quickly and adjusted to suit both the weights at the bottom of the line and the sensitivity desired for the tilting.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of Operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved hands-free fishing system with a signaling flag comprising, in combination:

a fishing rod formed of a handle at its lower extent and a cylindrical rod at its upper extent, the cylindrical rod having a lower extent, an upper extent and an intermediate extent therebetween, the intermediate extent having an eyelet extending radially outward therefrom, the upper extent of the rod having a region for the receipt of a portion of a bracket;

a supplemental cylindrical post having an upper end formed with a loop constituting an eyelet and having a lower end for supporting a flag and having an intermediate extent for receiving a portion of a bracket;

a reel secured to the handle with a line extending upwardly through the eyelet of the rod and the eyelet of the post and downwardly therefrom to the area being fished;

a bracket coupling adjacent regions of the rod and the post, the bracket having a spring plate of a resilient material with apertures at its opposite ends to receive central extents of the post and to allow the adjustment of the position with respect to each other, the plate having a central aperture, the bracket also having a pair of opposed convex portions secured around the rod adjacent to the upper extent, the convex portions having tabs having apertures and a bolt with a wing nut extending therethrough for adjustably tightening the bracket with respect to the rod at a predetermined location, the bracket also having a pin with a head extending radially outward from one of the convex portions and being located through the central aperture of the plate and with a coil spring around the pin to hold the plate at a fixed position with respect to the convex portion of the bracket;

a planar sheet having a large forward end and a small rearward end with a periphery therearound, the periphery having an inwardly directed slot for the passage of the line therethrough during operation and use; and an upwardly extending cylindrical support extending upwardly at an angle from the vertical of between about five and fifteen degrees in a direction whereby its axis overlies the innermost region of the linear recess, the cylindrical support having an interior surface of a size to receive the lower end of the handle whereby when fishing in a hands-free mode, a fish biting on the line will pull the line to pivot the post and raise the flag as an indicator that a bite has occurred.

2. A hands-free fishing system with a signaling flag comprising:

a fishing rod formed of a handle at its lower extent and a cylindrical rod at its upper extent the cylindrical rod having a lower extent, an upper extent and an intermediate extent therebetween, the intermediate extent having an eyelet extending radially outward therefrom the upper extent of the rod having a region for the receipt of a portion of a bracket;

a supplemental cylindrical post having an upper end formed with a loop constituting an eyelet and having a lower end for supporting a flag and having an intermediate extent for receiving a portion of a bracket;

a reel secured to the handle with a line extending upwardly through the eyelet of the rod and the eyelet of the post and downwardly therefrom to the area being fished;

a bracket coupling adjacent regions of the rod and the post, the bracket comprises a spring plate of a resilient material with apertures at its opposite ends to receive central extents of the post and to allow the adjustment of the position with respect to each other, the plate having a central aperture, the bracket also having a pair of opposed convex portions secured around the rod adjacent to the upper extent with tabs having apertures and a bolt with a wing nut extending therethrough for adjustably tightening the bracket with respect to the rod at a predetermined location, the bracket also having a pin with a head extending radially outward from one of the convex portions and being located through the central aperture of the plate and with a coil spring around the pin to hold the plate at a fixed position with respect to the convex portion of the bracket;

a planar sheet having a large forward end and a small rearward end with a periphery therearound, the periphery having an inwardly directed slot for the passage of the line therethrough during operation and use; and an upwardly extending cylindrical support extending upwardly to receive the lower end of the handle whereby when fishing in a hands-free mode, a fish biting on the line will pull the line to pivot the post and raise the flag as an indicator that a bite has occurred.

* * * * *